United States Patent [19]
Klopfenstein et al.

[11] Patent Number: 5,789,001
[45] Date of Patent: Aug. 4, 1998

[54] RUMINANT FEED AND METHOD FOR MAKING

[75] Inventors: Terry James Klopfenstein, Lincoln, Nebr.; Thomas Stephen Winowiski, Mosinee, Wis.; Robert Allen Britton, deceased, late of Lincoln, Nebr., by Peggy Jo Luebbe, executor

[73] Assignee: University of Nebraska, Lincoln, Nebr.

[21] Appl. No.: 489,111

[22] Filed: Jun. 9, 1995

[51] Int. Cl.$^6$ .................. A23K 1/14; A23L 1/20
[52] U.S. Cl. .................. 426/2; 426/93; 426/98; 426/103; 426/630; 426/807
[58] Field of Search ............. 426/2, 623, 807, 426/93, 98, 103, 630

[56] References Cited

U.S. PATENT DOCUMENTS

| | | | |
|---|---|---|---|
| 3,507,662 | 4/1970 | Leroyl et al. | |
| 3,619,200 | 11/1971 | Ferguson et al. | |
| 3,875,310 | 4/1975 | Rawlings et al. | 426/210 |
| 4,144,357 | 3/1979 | Mohammed | 426/96 |
| 4,377,596 | 3/1983 | Larsen | |
| 4,957,748 | 9/1990 | Winowiski et al. | 426/2 |
| 5,023,091 | 6/1991 | Winowiski | 426/2 |
| 5,064,665 | 11/1991 | Klopfenstein et al. | 426/2 |
| 5,143,737 | 9/1992 | Richardson | 426/2 |

FOREIGN PATENT DOCUMENTS 0043 202A3  1/1982  European Pat. Off.

OTHER PUBLICATIONS

"Storage Lipid Bodies In Plants and Other Organisms" by Denis J. Murphy; Prog. Lipid Res. vol. 29, No. 4, pp. 299–324, 1990.

"Efficiency of Transfer of Polyunsaturated Fats into Milk" Joel Bitman, L. P. Dryden, H. K. Goering, R. R. Wrenn, R. A. Yoncoskie and L. F. Edmondson, Animal Physiology and Genetics Institute, Nutrition Institute and Dairy Products Laboratory, USDA, Beltsville, Maryland 20705 and Washington, D.C., 20250; Journal of the American Oil Chemists' Society; vol. 50, Mar., 1973, pp. 93–98.

"Rumen Bypass and Protection of Proteins and Amino Acids", William Chalupa; Applebrook Research Center, Animal Health Products Division, SmithKline Corporation, West Chester, PA 19380; Journal of Dairy Science, vol. 58, No. 8, pp. 1198–1218.

"Effects of Particle Size and Formaldehyde Treatment of Soybean Meal on Milk Production and Composition for Dairy Cows", R. J. Crawford, Jr. and W. H. Hoover, Division of Animal and Veterinary Sciences, West Virginia University Morgantown 26506 Journal of Dairy Science vol. 67, No. 9, 1984; pp. 1945–1952.

"Influence of Tannins on the Nutritive Value of Soybean Meal for Ruminants" A. Driedger and E. E. Hatfield, University of Illinois at Urbana–Champaign, Urbana 61801; Journal of Animal Science, vol. 34, No. 3, 1972; pp. 465–468.

"Influence of Various Formaldehyde Treatments on the Nutritional Value of Casein for Wool Growth", J. A. Hemsley, P. J. Reis, and A. M. Downes; Aust. J. biol. Sci., 1973, 26: pp. 961–972.

"Effect of Roasting on Utilization of Soybean Meal by Ruminants", S. D. Plegge, L. L. Berger and G. C. Fahey, Jr., University of Illinois, Urbana 61801; Journal of Animal Science, vol. 55, No. 2, 1982: pp. 395–401.

"Further Studies on the Effects of Different Processing Temperatures on the Utilization of Solvent–Extracted Cottonseed Protein by Sheep", Lloyd B. Sherrod and Allen D. Tillman, Oklahoma Agricultural Experiment Station, Stillwater; pp. 510–516.

"Non–Enzymatic Browning–The Pandora box"; Introduction to the Biochemistry of Foods; J.B. S. Braverman: Elsevier Publishing Company, Amsterdam, London, New York, 1963: Chapter 20, p. 303.

"Induced Non–Enzymatic Browning of Soybean Meal. II Ruminal Escape and Net Portal Absorption of Soybean Protein with Xylose" by R. M. Cleale IV, R. A. Britton, T. J. Klopfenstein, M. L. Bauer D. L. Harmon and L. D. Satterlee; Journal of Animal Science 1987; 65: 1319–1326.

"Induced Non–Enzymatic Browning of Soybean Meal. III. Digestibility and Efficiency of Protein Utilization by Ruminants of Soybean Meal Treated with Xylose of Glucose" by R. M. Cleale IV, T. J. Klopfenstein, R. A. Britton, L. D. Satterlee and S. R. Lowry; Journal of Animal Science 1987, 65: 1327–1335.

"Soybean Utilization" by Harry E. Snyder and T. W. Kwon; Van Nostrand Reinhold Company publishers; pp. 26–29.

Primary Examiner—Arthur L. Corbin
Attorney, Agent, or Firm—Vincent L. Carney

[57] ABSTRACT

A ruminally inert fat for a ruminant feed is made by applying reducing sugars to oilseed meats and heating to induce non-enzymatic browning. The process is controlled to ensure penetration of the reducing sugars into the interior of cracked oilseed meat prior to browning. The browning reaction renders the protein which surrounds the oil resistant to rumen bacterial degradation to thereby encapsulate the oil in a protective matrix.

41 Claims, 3 Drawing Sheets

RUMINANT FEED AND METHOD FOR MAKING

BACKGROUND OF THE INVENTION

This invention relates to a livestock feed, the preparation of a livestock feed and the feeding of livestock to increase the utilization of lipids and protein by ruminants.

It is known: (1) to feed lipids to ruminants as a source of energy; (2) to protect unsaturated lipids in the rumen of dairy cows so as to pass unsaturated lipids into the milk; (3) to feed lipids which are rumen inert and which do not interact with or affect rumen bacteria; (4) to feed lipids treated by extrusion of a combination of starch and lipid; and (5) to treat protein-encapsulated lipid to render it undegradable by rumen bacteria, thereby rendering the lipid rumen inert. In some cases lipids have been fed in conjunction with rumen undegradable protein and it is known that the application of heat or heat and reducing sugars aids in reducing the degradability of protein with heat.

In some prior art techniques for feeding lipids, there is no intention of rendering said lipids ruminally inert, such as for example, roasting or extrusion of full fat soybeans. Roasting soybeans has a disadvantage in that the severity of the heating required to achieve the desired level of rumen undegradable protein is such that significant quantities of the nutrients may be rendered undigestible. Extrusion of soybeans has the disadvantage in that it ruptures the organelles that contain the lipid. The organelles consist of oil contained in protein membranes which, when left intact and rendered undegradable, provide the protective envelope around the lipid. If ruptured, they allow more rapid release of unprotected lipid into the rumen, resulting in microbial disfunction and subsequent milk fat depression.

In the intentional prior art feeding of lipids which are rumen inert and in the preparation of lipids so they do not interact with or affect rumen bacteria, some of the treatments have been to: (1) chemically alter fats and oils such that they become insoluble, either by formation of a calcium salt or by hydrogenation; and (2) extrude a combination of starch and fat/oil such that the starch is gelatinized and forms a protective matrix enclosing the lipid. Extrusion of a combination of starch and lipid is disclosed in U.S. Pat. No. 5,120,585.

Hydrogenation has the disadvantage in that: (1) hydrogenation of polyunsaturated fatty acids (PUFA) to form solid fats generates trans-fatty acids which have been shown to depress synthesis of milk fat in dairy livestock; (2) the trans-fatty acid may carry into the milk and dietary trans-fatty acids have been associated with cardiovascular problems in humans; and (3) hydrogenated fats have poor digestibility as compared with PUFA. Calcium salts of the lipids have the disadvantage of poor palatability to at least some ruminants.

Extrusion of a combination of starch and lipid has the disadvantage of: (1) requiring refined starting materials which results in higher production costs; and (2) not providing any protected protein so that supplemental feeds are still be required. It is recommended that protein level in the diet be increased by 0.5% for each 1% increase in lipid.

Prior art methods of coating lipids to render them rumen inert include (1) spray-drying an oil/casein emulsion with subsequent treatment with formaldehyde, and (2) direct treatment of oilseeds with formaldehyde in accordance with Canadian Patent 1,206,368. This type of treatment may form a rumen inert coat around the lipids under some conditions. Formaldehyde, however, is not approved by the United States Food and Drug Administration for this type of application in animal feeds.

U.S. Pat. Nos. 4,957,748; 5,023,091 and 5,064,665 teach that reducing carbohydrates, i.e. xylose, and lignosulfonates that contain such reducing carbohydrates, applied under proper conditions of heat and moisture, can protect vegetable proteins from degradation by rumen bacteria. Application of reducing sugars to soybeans prior to roasting should result in non-enzymatic browning and thereby enclose the lipid in a protective matrix. However, it has been discovered that such a process leads to surface protection only; the sugar solution does not penetrate into the interior of the bean, thus the interior is roasted but not browned. Fracturing the surface of the roasted/non-enzymatically browned bean causes loss of protection. Surface fracturing may be caused by grinding, pelleting, or mastication.

Each of the prior art feeds and methods described above carries one or more undesirable traits, which may include loss of nutrient availability, high cost, poor palatability, or generation of trans-fatty acids. None of them provide a combination of rumen protected protein and rumen inert fat that is palatable, digestible, and cost-effective.

SUMMARY OF THE INVENTION

Accordingly, it is an object of the invention to provide a novel feed which increases the efficiency of utilization of lipids by animals.

It is a further object of the invention to provide a novel method for feeding livestock.

It is a still further object of the invention to provide a novel method for preparing a feed which reduces the microbial degradation of the feed lipid in a superior manner.

It is a still further object of the invention to provide a novel feed for ruminents that provides bypass protection for both protein and lipids.

It is a still further object of the invention to provide a novel feed which exhibits reduced degradation of lipids in the rumen and is utilized in the lower digestive tract.

It is a still further object of the invention to provide a novel feed that exhibits reduced degradation of lipids in the rumen and, when fed to certain animals such as dairy cows, results in a dairy product having a lipid content affected by the nature of the lipid that is bypass-protected in the feed.

It is a still further object of the invention to provide a novel method of feeding milk-producing animals with by-pass protected unsaturated lipids so as to provide a selected range of unsaturated vegetable lipids in the milk.

It is a still further object of the invention to provide a seed at least partly composed of lipid bodies having the size range of 0.1 through 10 micrometers with a membrane surrounding them formed of reaction products of the membrane protein and a reducing carbohydrate.

In accordance with the above and further objects of the invention, a feed for animals includes ruminally inert lipid. Preferably the lipid is a vegetable oil. Thus, the vegetable oil is not hydrogenated by rumen bacteria nor does it inhibit fiber digestion yet the vegetable oil is digestible in the small intestine, and under some circumstances, some of it may be transferred into the animal's milk. If some or all of the lipids are vegetable oil they may increase the proportion of lipids in that milk that are in monounsaturated or polyunsaturated form.

Protection is achieved by non-enzymatic browning of the proteinaceous organic material which surrounds the oil in oilseed meats. Preferably, the non-enzymatic browning is a principally reversible early or intermediate Maillard reaction. Non-enzymatic browning renders the proteinaceous material resistant to bacterial degradation and thereby encapsulates the oil in a protective matrix. The process comprises applying reducing sugars to oilseed meats and heating to induce non-enzymatic browning. The process is controlled to ensure penetration of the reducing sugars into the interior of the oilseed meat before the browning reaction is initiated.

A feed for animals comprises a mixture of organic materials including at least one reaction product of an oilseed meat and a reducing carbohydrate. The percentage of reducing carbohydrate on oilseed meat may be in the range of about 0.1% to about 40% by weight depending upon the seed and carbohydrate employed. The actual percentage of reducing carbohydrate on oilseed meat depends on the carbohydrate and on the protein. The oilseed meat is selected from soybeans, canola seed, cotton seed, sunflower seed, linseed, rape seed, safflower seed and sesame seed.

The reducing carbohydrate comprises a reducing sugar selected from xylose, glucose, fructose, mannose, lactose, ribose, hemicellulose extracts and their hydrolysates, sugars contained in spent sulfite liquor, molasses and its hydrolysate and corn products and their hydrolysates and mixtures thereof. If xylose, the percentage of xylose on oilseed meat is about 1% to 6%, whereas if the reducing carbohydrate is glucose, the percentage of glucose on oilseed meat is about 2% to about 20%.

Preferably, the reducing carbohydrate is a component of spent sulfite liquor or dried spent sulfite liquor. Spent sulfite typically includes about 10% to about 40% reducing carbohydrates as a component thereof. When employed in the present invention the percentage of spent sulfite liquor solids on oilseed meat is about 2% to about 40%. The spent sulfite liquor employed in the present invention is typically obtained from the pulping of hardwoods and/or softwoods.

A method of making an animal feed comprises the steps of selecting a desired oilseed, cracking the seed, applying a reducing sugar to the cracked seeds, allowing the sugar to penetrate into the interior of the seed, and thereafter heating the mixture at a temperature, pH and percent moisture for a time sufficient to cause non-enzymatic browning of the proteinaceous organic material which surrounds the oil in the oilseed to thereby encapsulate the oil in a protective matrix.

The percentage of reducing carbohydrate on oilseed is about 0.1% to about 40% by weight with the preferred ratio depending upon the seed and sugar employed. The seed employed may be selected from soybeans, canola seed, cotton seed, sunflower seed, linseed, rape seed, safflower seed and sesame seed. Cracking may be accomplished in any conventional manner such as mechanically by a roller mill.

Application of the sugar is preferable as a solution and may also be done in any conventional manner such as spraying, dripping, mixing or the like. Advantageously, steam is employed to cause the reducing sugar to penetrate the seed. However, other methods resulting in sugar penetration may also be employed such as allowing a mixture of the sugar and seed to steep, with or without heat, so that the sugar penetrates the interior of the seed and is positioned so that a sufficient amount of reducing sugar surrounds a substantial portion of the oil bodies to cause an early or intermediate Maillard reaction on more than one half of the oil bodies having a diameter of between 0.01 and 10 micrometers.

Finally, the mixture is heated, preferably by steam, to result in non-enzymatic browning at a pH of from about 2 to about 10.5, a percent moisture from about 6% to about 40%, a temperature from about 20° to about 150° C. and for a time of from about 20 minutes to about 72 hours. Preferably, the steam not only causes the sugars to penetrate the seed but thereafter the steam results in maintenance of an appropriate amount of heat to cause non-enzymatic browning. It should also be understood that the seeds could be dried either before or after cracking in order to enhance the penetration of the sugar into the interior of the seed.

The improved feed may be substituted for part or all of the usual concentrate being supplied to the animal resulting in improved efficiency of milk and/or meat production. In particular, the ruminally inert vegetable oil is not hydrogenated by rumen bacteria so that the vegetable oil is digestible post ruminally and can be transferred into milk in monosaturated or in polyunsaturated form. Increased production yields may be obtained with the same feed levels, or the same production yields may be obtained at reduced feed levels. In one embodiment, the seeds are selected, and under some circumstances, protein or fat added to provide the desired mixture of saturated and unsaturated lipids in the milk of an animal.

From the above summary, it can be understood that the feed of this invention and its method of making and using it have several advantages, such as for example: (1) both oil and protein are better utilized; (2) it is economical to make; and (3) it may be used to improve the quality of milk.

BRIEF DESCRIPTION OF THE DRAWINGS

The above noted and other features of the invention will be better understood from the following detailed description when considered in connection with the accompanying drawings, in which.

DETAILED DESCRIPTION

Figure 1:
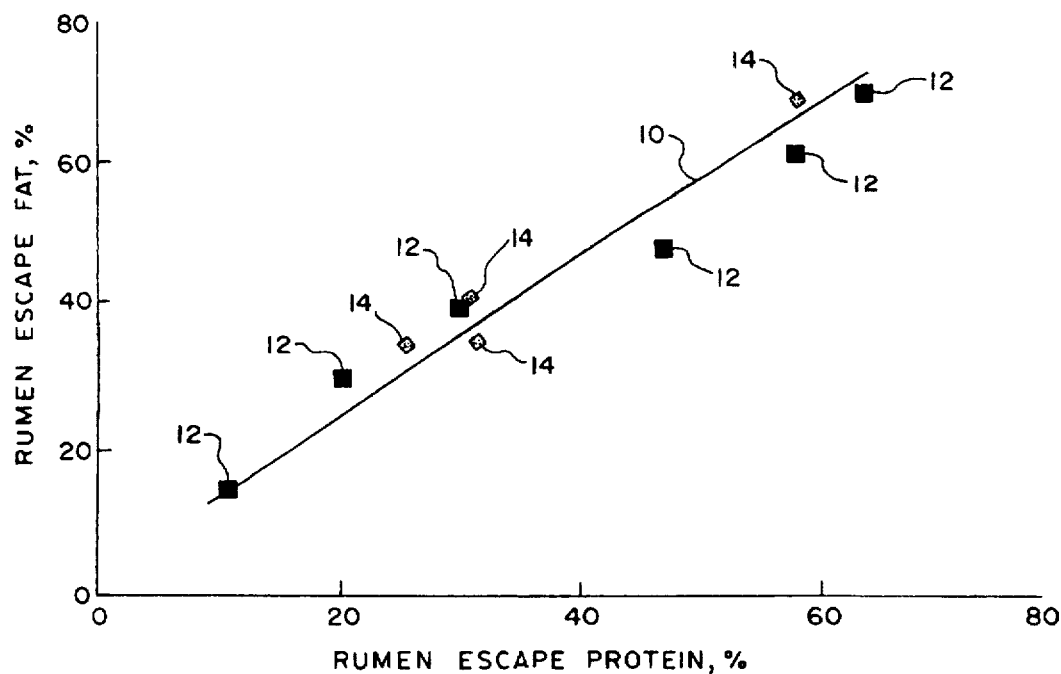
FIG. 1 is a graph showing the relationship between the escape of vegetable oil from loss in the rumen to the level of rumen escape protein.

The animal feed includes a substantial amount of small particles having a lipid interior and a coat formed of reaction products of proteinaceous membranes from oilseeds and reducing carbohydrates. In the preferred embodiment, the oilseeds used to form this feed are those found in high quality feeds such as soybeans, canola seed, cotton seed, sunflower seed, linseed, rape seed, safflower seed and sesame seed.

Because the more reactive the reducing carbohydrate is the easier it is to form the above referred to reaction products, sugar sources are selected from reducing sugars, such as for example: xylose, glucose, fructose, mannose, lactose, ribose, hemicellulose extracts and their hydrolysates, sugars contained in spent sulfite liquor, molasses and its hydrolysate, corn products and their hydrolysates and mixtures thereof. Preferably, the reducing sugars used are those from economical sugar sources such as spent sulfite liquor or dried spent sulfite liquor which is a by-product of some wood industries and a source of xylose. However, mixtures of sugars are appropriate and may be utilized herein. According, in this specification, the term. reducing sugars, shall include the above unless specified otherwise.

For reasons of economy, the animal feed disclosed herein and the process for making such feed is intended principally as a protein supplement for orthodox feeds. Typically, protein supplements are feedstuffs containing a minimum of 20% protein with at least 25% of the protein being microbially degradable protein. Microbially degradable protein is protein which is cleaved by microbial protease. The term "orthodox feed" means the feeds normally fed to ruminants. Such feeds are well known in the art and include high quality protein feeds as well as other feeds of lesser protein quality. Such feeds include soybean meal, cotton seed meal, feather meal, blood meal, silages, meat and bone meal, sunflower seed meal, canola meal, peanut meal, safflower meal, linseed meal, sesame meal, early bloom legumes, fish products, by-product protein feedstuffs like distillers and brewers grains, milk products, poultry products, hays, corn, wheat, alfalfa, barley, milo, sorghum and mixtures thereof.

The reaction products of sugars and proteins, i.e. termed "non-enzymatic browning" herein, means a condensation product obtained by reacting a protein useful in feeding livestock and commonly found in orthodox livestock feeds, and a reducing carbohydrate selected for its efficiency in reduction reaction with the proteins. This reaction is well known in the art, and it is believed that the extent of the reaction forming the present feed corresponds to what has been described in the literature as early Maillard reactions.

The early Maillard reactions are well known by those skilled in the art so that pH, temperature, moisture and time required to carry the reaction to its optimum extent can readily be determined with little experimentation by those skilled in the art. The use of the early Maillard reaction to treat protein for use in feed is described in U.S. Pat. Nos. 4,957,748; 5,023,091 and 5,064,665, the disclosures of which are incorporated herein by reference. Advantageously, the pH of the reaction is from about 2 to about 10.5. The temperature of the reaction ranges from about 20° C. to about 150° C. (Centigrade) with 80° C. to 100° C. preferred. The time of the reaction ranges from about 20 minutes to about 72 hours with 1 hour to 4 hours preferred. The amount of moisture affects the reaction, and the percent moisture ranges from about 6% to about 40% with 15% to 25% preferred.

It is believed that the reaction is generally a 1 mole to 1 mole reaction between free amine groups and the reducing carbohydrate and with some consideration being given to other reactions in the feed, the quantities of sugars which are most economically utilized with the feed can be determined even though some suitable feed materials are not specifically described herein.

A reducing sugar and protein are mixed in quantities sufficient to cause enough of the alpha and epsilon amino groups in the protein to react with the carbonyl groups in the sugar to form a reaction product when the mixture is heated at a temperature, time and pH to cause reactions corresponding to those in formula 1, where R is a protein having the alpha amino group or epsilon amino shown. R1 is the remaining portion of the carbohydrate shown in formula 1; and R2 is a portion of R1 resulting from the reaction as shown.

The improved feed described herein may be prepared in several different ways utilizing different ones of the suitable proteinaceous oilseeds and different ones of the reducing carbohydrates as raw materials. In each case, a reaction takes place between the reducing carbohydrate and proteins in the oilseeds which encapsulate the oil in a protective matrix thereby forming a compartment of protected protein that contains lipid such that the entire compartment and its lipid content escape degradation by rumen

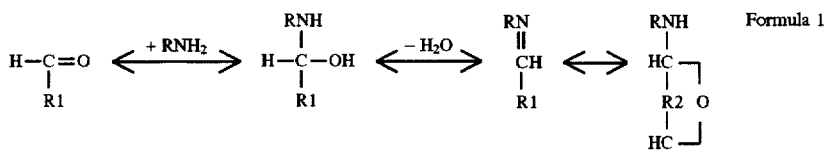

Formula 1 bacteria yet are digestible in the small intestine or abomasum of the animal.

Since the rumen inert vegetable oil is digestible post-ruminally, some of it is transferred into the milk of the ruminant in polyunsaturated form. By rendering the vegetable oil "rumen inert", the energy density of the feed can be increased and the level of polyunsaturated fat in the milk increased while at the same time the formation of trans-fatty acids by bacterial hydrogenation in the rumen can be minimized. By "ruminally inert" it is meant the lipid is prevented from harmful interaction with rumen bacteria yet is rendered available for digestion and absorption in the post-rumen gastrointestinal tract.

The percentage of reducing carbohydrate on proteinaceous oilseeds ranges from about 0.1% to about 40% by weight depending upon the seed and sugar employed. Preferably, an amount of about 1% to about 5% is appropriate. The preferred source of reducing sugar is sulfite liquor. Spent sulfite liquor is that portion of the wood solubilized in the acid sulfite pulping of hardwood and/or softwood plant material. The plant material is cooked at elevated temperatures at a pH of less than pH7 in a solution of $MHSO_3$ where M is the cation which can include $NH_4^+$, $Na^+, Ca^{++}, Mg^{++}$ and $K^+$. This well known process is commonly used in making cellulose pulp for the manufacture of paper products. Spent sulfite liquors are comprised of about 40% to about 70% M-lignosulfonates, about 5% to about 30% reducing sugars, and about 2% to about 20% of oligosaccharides. Spent sulfite liquor reducing sugars are typically a mixture comprised of glucose, mannose, xylose, galactose and arabinose. The relative proportions among the sugars vary depending upon the exact pulping conditions and the plant material used in the process.

Generally, the feed is prepared by first selecting the desired oilseed or mixture of seeds, and then breaking the seed cuticle by mechanical cracking, e.g. a roller mill operation. Any method of breaking or cracking the seed cuticle may be employed as long as the seed is not crushed to release its oil during the process.

After cracking, the seed is treated with a reducing carbohydrate by applying the sugar, preferably in solution, in any conventional manner to the exterior of the seed. For example, the reducing carbohydrate may be applied by spraying the solution thereon, dripping the solution thereon, mixing or other means.

Thereafter, the sugars in the mixture are caused to penetrate the interior of the seed. This can be accomplished with or without heat. If no heat is utilized, the mixture is typically allowed to steep anywhere from about one minute to one hour to ensure penetration of the sugars into the interior of the seed. Heat may also be utilized to cause the sugars to penetrate the seed.

If heat is employed, steam is preferred. Heating with steam causes a net migration of moisture to be from the surface of the seed to its center which thus carries the sugar along with it into the interior of the seed. This penetration of heat and sugar at the same time contributes to a more uniform non-enzymatic browning throughout the seed particle. Thus, when the seed particle is thereafter ground, there is no loss in protein protection and the vegetable oil contained therein remains ruminally inert. In this manner, mastication by the animal cannot destroy the protection.

After sufficient penetration by the sugars, the seed and reducing carbohydrate is heated at a temperature, pH, moisture level and time sufficient to cause non-enzymatic browning, if steeping was employed, the mixture can be roasted with hot air or heated with steam. Likewise, if steam was employed to cause penetration of the sugars, heating is thereafter maintained to result in non-enzymatic browning. Again, either roasting with hot air or heating with steam may be employed to cause non-enzymatic browning, but if steam was employed to cause penetration of the sugars, it is desirable to continue to use steam to result in non-enzymatic browning. Thus, the term, sufficient penetration means, in this specification, that enough reducing carbohyudrate is distributed within the oil-seed so that at least thirty percent of the lipids are sufficiently encased after appropriate heating and time for the early Maillard reaction to take place and for the lipid bodies within the oil seed to be rumen inert.

As an optional step, the seeds may be dried before or after cracking. Typically, this is accomplished by heating with hot air. The advantage to drying the seeds prior to application of the sugar solution is that dry seeds more readily absorb the sugars into the interior of the seed since the low moisture content of the seed tends to draw the sugar solution into its interior. However, drying increases production costs and thus is not essential to protecting the lipid in accordance with the present invention.

The resulting product includes bodies of lipids ranging in size from one half micrometer to 10 micrometers but being concentrated in a size range depending on the type of oilseed. In the case of soybeans the size range is between 0.5 and 2 micrometers. These bodies include lipid in its in situ natural form surrounded by a reaction product of a protein and a reducing sugar, with the ratio of reaction product to lipid being between 1% such as may be the case with peanuts to 35% which may be the case with some soybeans. The protein layer is more dense than the lipid layer and relatively thin being less than 10% of the diameter of the oil body in thickness. These bodies which protect the oil within a reaction product of a protein and a reducing sugar are referred to herein as by-pass protected oil particles.

Once the by-pass protected oil particles have been formed in the processed oilseed, the oilseed may be ground because the protected particles are so small many remain intact and provide a ground meal with substantial rumen inert oil. The type of proteins forming the shell around the lipid is oleosin and the reaction product of the protein and reducing carbohydrate has a ratio of reducing carbohydrate on the oleosins of about 0.5% to about 40% by weight such that the degradability of the feed protein by rumen microorganisms is reduced and there is significant protein and lipid digestibility in the post rumen tract.

The amount of by-pass protected lipid in a feed can be tailored to the situation. Thus, the amount of protein and the amount of protected lipid can be determined in a given feed. Moreover, with some experimentation, the amount of protected lipid that is carried over into the milk of milk producing ruminants without alteration may be determined and a final composition of feed including at least some by-pass protected lipids may be selected to alter the characteristics of the milk into a desired form.

Some of the protected lipid bodies may include a protected layer of a reaction product of an early Maillard reaction and some of the irreversible later stages or the more difficult irreversible Maillard reaction. By tailoring the amount of heat and reducing sugar, the proportions of oilseed having different degrees of protection corresponding to different stages of the Maillard reaction may be controlled for the by-pass protected oilseeds. Thus the stage of the Maillard reaction utilized with the treatment may be used to affect the amount of vegetable fat that is passed through to the milk of a milk producing ruminant. The efficacy of the present invention is illustrated by the following nonlimitive examples, wherein parts and percentages specified are on a weight basis.

EXAMPLE 1

This example illustrates that non-enzymatic browning protects oil contained in situ in oilseeds. In this example, oilseeds were cracked, treated with a solution containing reducing sugars, and heated to produce browning. Some samples were also heated without sugar treatment.

Samples were evaluated by the dacron bag method. They were incubated in the rumen of a cow during which time the oilseeds were subject to attack by rumen microbes. The samples were retrieved from the rumen and analyzed for remaining protein and lipid levels. The results are shown in Table 1 and in FIG. 1 and indicate the percentage of protein and fat remaining from oilseeds after digestion in the rumen in oilseeds treated in accordance with the invention or not treated.

In FIG. 1, there is shown a graph having abscissae of the percentage of escape protein and ordinates of the escape lipid with a curve 10 fit to data points for both treated and untreated soya and canola. Curve 10 indicates a linear relationship between the escape protein and lipid for both soya as shown by data points 12 and canola shown by data points 14. The data covers both treated and untreated soya and canola. Table 1 indicates more clearly the better protection provided by Maillard treatment.

The data shows:

1. A linear correlation between the percentage of escape protein and escape oil; escape oil increased directly with escape protein.

2. Protection was similar for canola seeds and soybeans.

3. Treatment of oilseeds with heat and reducing carbohydrate, supplied as either xylose or lignosulfonate, improved both protein escape and fat escape. In the one case where $LSO_3$ failed to

TABLE 1

Escape of Nutrients (%) from Digestion in the Rumen

| Treatment | Remaining Protein | Remaining Fat |
| --- | --- | --- |
| Fine soya | 10.8 | 14.6 |
| Fine soya + Heat | 20.1 | 29.2 |
| Fine soya + Heat + 2% Xylose | 63.5 | 69.7 |
| Fine soyal + Heat + 5% LSO$_3$ | 47.0 | 47.1 |
| Coarse Soya | 29.9 | 39.2 |
| Coarse Soya + Heat + 5% LSO$_3$ | 58.0 | 61.1 |
| Canola | 30.9 | 40.6 |
| Canola + Heat | 25.5 | 34.0 |
| Canola + Heat + 2% Xylose | 58.1 | 68.8 |
| Canola + Heat + 5% LSO$_3$ | 31.4 | 34.6 | protect protein in canola, there was also no protection of fat. This agrees with the theory that fat can be protected by protecting the protein membrane that encases it.

EXAMPLE 2

This example shows the improved results when the oil to be protected is in the in situ condition as shown by example 1 compared to meal as shown in this example 2.

Procedure:

Soybean meal (44%) was screened over a 50 mesh sieve to remove fines. Whole soybeans were coarsely ground and sieved; the fraction passing through an 8 mesh sieve, but retained on a 50 mesh sieve, was collected for treatment. The ground beans were asperated to partially remove hulls.

Treatment of Soybean Meal:

Soybean oil was added to soybean meal and the combination treated with sugar and browned. Alternately, soybean meal was treated with sugar and browned, and oil then added to the browned meal. As a positive control, ground full-fat soybeans were treated with sugar and browned. This procedure was repeated using hydrogenated soybean oil in place of liquid oil.

The samples were prepared as follows:

1. 2.0 g xylose were dissolved in 20 g water and mixed thoroughly with 100 g of soybean meal. The sample was prewarmed in the microwave oven, placed in a covered jar, and held at 105° C. for 90 minutes in a forced-air oven. The sample was then spread on paper overnight to dry.
2. As (1) but after drying 15 g of warm oil was mixed into the meal.
3. As (1) but 5.0 g of Ultrazine CA (a desugared softwood lignosulfonate) were used in place of 2.0 g of xylose.
4. As (3) but after drying 15 g of warm oil was mixed into the meal.
5. 15 g of warm oil were mixed into 100 g of soybean meal and treated as (1), adding 2.0 g of dissolved xylose onto 115 g of oil/soybean meal and heating.
6. 15 g of warm oil were mixed into 100 g of soybean meal and treated as (3), adding 5.0 g of dissolved Ultrazine onto 115 g of oil/soybean meal and heating.

This procedure was repeated on a second set of samples (7–12) but oil (used in 2, 4, 5, 6) was replaced with solid shortening (hydrogenated oil). The shortening was warmed enough to allow good mixing with the soybean meal.

13. Water (20 g) was mixed into 115 g of ground beans and heated in 105° C. forced-air oven for 90 minutes.
14. 2.0 g xylose was dissolved in 20 g water, mixed with 115 g of ground beans, and heated in 105° C. oven for 90 minutes.
15. 5.0 g of Ultrazine CA was dissolved in 20 g of water, mixed with 115 g of ground beans, and heated in 105° C. oven for 90 minutes.
16, 17 & 18. Repeat 13, 14 and 15.

Samples 13–18 were prepared and heated as a group. After 90 minutes, they were spread on paper to dry overnight.

Figure 2:
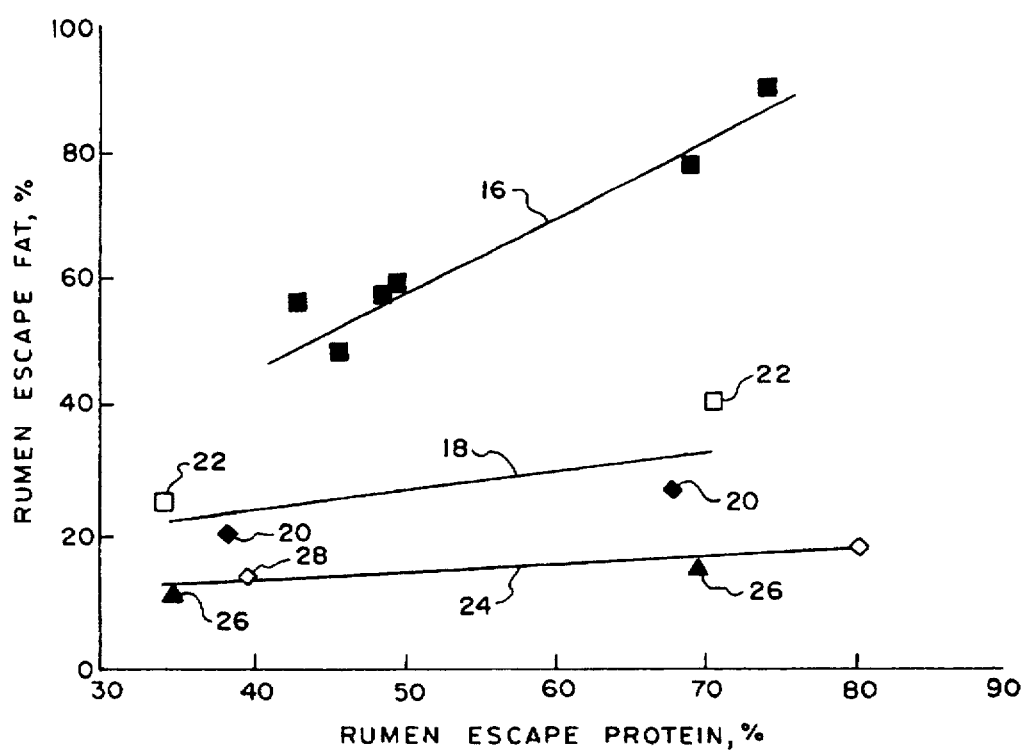
FIG. 2 is a graph showing the relationship between the level of escape fat in full fat beans and the level of escape protein in those beans for in situ lipid, lipid add before ruman digestion and liped added after digestion.

Treated samples were sent to University of Nebraska where they were evaluated for rumen escape protein and rumen escape fat using the dacron bag technique. The results are reported in Table 2 and in FIG. 2. In FIG. 2, the abscissae are in percentage of escape protein, the ordinates are in percentage of escape fat, curve 16 represents samples with only the oil from the ground seeds, curve 18 represents oil added before non-enzymic browning indicated by data points 20 and fat added before non-enzymic browning indicated by 22, and curve 24 represents lipid added after non-enzymic browning as indicated by data points 26 for oil added after non-enzymic browning and data point 28 for fat added after non-enzymic browning.

Results

1. Treatment of protein with xylose increased the level of escape protein; this response was not affected by fat. Treatment of full-fat beans with xylose significantly increased the level of escape fat (P<0.01).
2. The level of escape fat in full-fat beans was directly proportional to the level of escape protein in those beans. There was no correlation between escape protein and escape fat when the fat was added onto soybean meal. Protein protection effected only in situ fat.
3. Fat that was added before heating had significantly higher escape value than fat added after browning (P<0.01). Escape levels averaged 28.2 and 14.9% respectively.
4. Ultrazine CA, a desugared softwood lignosulfonate, did not effect escape protein or escape fat. Thus, desugared lignosulfonate was not

TABLE 2

| Treatment | | | | Rumen Escape, % | | |
| --- | --- | --- | --- | --- | --- | --- |
| Agent, % | | | | Fat | | |
| Sample | Xylose (Grams) | LSO$_3$ (Grams) | Oil/Fat Added | Remaining (Grams) | Protein | Fat |
| 1 | 2 | 0 | None | 3.0 | 64.8 | 55.0 |
| 2 | 2 | 0 | Oil added after treatment | 14.7 | 69.5 | 15.7 |
| 3 | 0 | 5 | None | 2.8 | 39.8 | 42.1 |
| 4 | 0 | 5 | Oil added after treatment | 14.0 | 34.7 | 11.4 |
| 5 | 2 | 0 | Oil added before treatment | 15.7 | 67.6 | 26.8 |
| 6 | 0 | 5 | Oil added before treatment | 15.2 | 38.2 | 20.4 |
| 7 | 2 | 0 | None | 3.2 | 72.8 | 54.8 |
| 8 | 2 | 0 | Fat added after treatment | 15.4 | 80.2 | 18.5 |
| 9 | 0 | 5 | None | 2.8 | 35.4 | 40.1 |
| 10 | 0 | 5 | Fat added after treatment | 15.2 | 39.6 | 14.2 |
| 11 | 2 | 0 | Fat added before treatment | 15.6 | 70.7 | 40.5 |

TABLE 2-continued

| Sample | Treatment Agent, % Xylose (Grams) | LSO₃ (Grams) | Oil/Fat Added | Fat Remaining (Grams) | Rumen Escape, % Protein | Fat |
|---|---|---|---|---|---|---|
| 12 | 0 | 5 | Fat added before treatment | 14.6 | 34.1 | 24.9 |
| 13 | 0 | 0 | Ground soybeans, in situ oil | 14.6 | 42.8 | 56.1 |
| 14 | 2 | 0 | Ground soybeans, in situ oil | 15.0 | 74.3 | 89.9 |
| 15 | 0 | 5 | Ground soybeans, in situ oil | 14.9 | 48.5 | 57.6 |
| 16 | 0 | 0 | Ground soybeans, in situ oil | 15.6 | 49.6 | 59.3 |
| 17 | 2 | 0 | Ground soybeans, in situ oil | 16.4 | 69.1 | 78.1 |
| 18 | 0 | 5 | Ground soybeans, in situ oil | 16.0 | 45.5 | 48.5 | effective in protecting protein, nor did it offer protection of the fat.

5. Hydrogenated fat had higher escape values than oil, 24.5% versus 18.6% but the difference was not significant.

Discussion.

Free oil absorbed in a protected protein matrix was not protected. This is indicated in treatments in which soybean meal was treated with xylose and heated, with oil being added to the protein either before or after browning. There was no indication that the protected protein provided significant protection to the oil. This indicates that treating extruded oilseeds would not produce protected fat when the oil is released from the oil bodies of its native state.

Hydrogenated soybean oil (Crisco) was added to protected soybean meal. It showed slightly more ability to escape the rumen, probably due to its lower motility. However, it did not show interaction with the protected protein matrix. Use of a solid fat insured it would remain in the protein matrix but it was not protected by that matrix. This confirms the need for the oil to be in its native condition.

This experiment confirms that protection of oilseed protein also protects the fat that is contained in the protein matrix. It also appears from these results that the fat must be in its natural state to receive protection. When fat is added to protected soybean meal it received little or no protection. Apparently fat that can be absorbed, by the meal can also leak out of the meal. Fat that is contained in protein membranes of the oilseeds will not be released until that membrane is broken. Protection of the protein from bacterial degradation helps to maintain the membrane intact, thus protecting the oil.

Hydrogenated fat had less loss from the dacron bag. The difference between the loss of fat and oil was not significant but it makes sense that the hydrogenated fat, which is solid at body temperature, would not escape from the dacron bags as readily as the liquid oil.

Addition of fat prior to heating showed significantly less loss from the dacron bag versus addition after heating. This occurred regardless of the level of escape protein. It is likely that the heating process facilitated deeper penetration of the lipid into the protein matrix.

These results help to predict the effect of fat protection in roasted and extruded beans. The level of escape fat in roasted beans should increase directly in proportion to the level of escape protein. However, this would not be expected in extruded beans. Extrusion disrupts tissues to the point where oil is released from its protective matrix. Escape fat is dependent on the degree of disruption of these cells.

EXAMPLE 3

This example shows the relative advantages and disadvantages of steam conditioning versus dry roasting, and determines that sugar penetration into the seed prior to browning enhances oil protection in the rumen.

In this experiment, a sugar solution was added onto cracked beans and allowed to steep at room temperature for 30 minutes. The beans were then heated by three methods:

1. Roasting with hot air, as is commercial practice.
2. Heating with steam, hot steeping, and roasting.
3. Heating with steam followed by roasting with hot air.

The beans were then evaluated. A more detailed summary of this example follows:

Procedure:

Soybeans were cracked and aspirated to remove hulls. Cracking was such that each bean was broken into 4 to 16 pieces. When all were prepared in this manner, they were split into five batches of 100 lbs. each. Batches were treated as follows:

Batch 1:

Thirty lbs. were set aside (sample 4). The Remaining 70 lbs. were placed in Littleford mixer, water was added, followed by heating to 100° C. by direct addition of steam. The beans were brought up to temperature in 5–7 minutes. Half of the steamed beans were transferred immediately to a roaster (sample 1) and half were stored in an insulated container for 60 minutes (sample 3).

Residence time in the roaster was 30 minutes. Temperature varied between 90 and 110° C., depending on the amount of moisture evaporating from the meal at any given time.

The 30 lbs. previously set aside followed the steamed beans into the roaster (sample 2). These were then followed by beans that had been steamed and steeped for 60 minutes (sample 3). A small portion of the last sample was spread in a thin layer to air dry (sample 5) rather than sending it through the roaster.

Batch 2 and 3:

These replicate batches were run as Batch 1 except ML-Z, a xylose rich liquor, was added in place of water when the beans were first placed in the Littleford mixer. Samples were collected as follows:

Sample 6 & sample 7: Mixed with ML-2 and roasted.
Sample 8 & sample 9: Steamed with ML-2 and roasted.
Sample 10 & sample 11: Steamed with ML-2, steeped, and cooled in a sealed container.
Sample 12 & sample 13: Steamed with ML-2, steeped, and spread to cool and dry.
Sample 14 & sample 15: Steamed with ML-2, steeped and roasted.

Additional batches were steamed with ML-2, steeped, and spread to air dry. No samples were collected. These treatments were made for an ongoing feeding trial.

Sample moistures were determined by drying 2 g of each overnight in a 105° C. oven.

Samples (1–15) were sent to the University of Nebraska for evaluation as follows:

TABLE 4

Summary of Results

| Sample # | Steam | ML-2 DM (%) | Steep (Min.) | Roast (Min.) | Drying Method | Moisture (%) | NH$_3$—N Release | In Situ Escape, (%) Protein | Fat |
|---|---|---|---|---|---|---|---|---|---|
| 1 | Yes | 0 | 0 | 30 | Roaster | 8.2 | 56.1 | 38.2 | 40.9 |
| 2 | No | 0 | 0 | 30 | Roaster | 4.0 | 60.9 | 30.1 | 33.4 |
| 3 | Yes | 0 | 60 | 30 | Roaster | 8.8 | 52.7 | 39.1 | 41.1 |
| 4 | No | 0 | 0 | 0 | No Dry | 10.1 | 65.3 | 25.9 | 31.3 |
| 5 | Yes | 0 | 60 | 0 | Thin Bed | 6.1 | 56.4 | 32.3 | 36.4 |
| 6 | No | 5 | 0 | 30 | Roaster | 5.2 | 52.0 | 56.3 | 58.0 |
| 7 | No | 5 | 0 | 30 | Roaster | 4.5 | 53.3 | 57.0 | 56.2 |
| 8 | Yes | 5 | 0 | 30 | Roaster | 7.4 | 25.6 | 60.6 | 54.3 |
| 9 | Yes | 5 | 0 | 30 | Roaster | 6.9 | 26.1 | 61.8 | 58.4 |
| 10 | Yes | 5 | 60 | 0 | No Dry | 18.8 | 19.4 | 54.1 | 48.8 |
| 11 | Yes | 5 | 60 | 0 | No Dry | 18.3 | 19.3 | 62.0 | 53.3 |
| 12 | Yes | S | 60 | 0 | Thin Bed | 6.4 | 20.0 | 56.4 | 52.0 |
| 13 | Yes | 5 | 60 | 0 | Thin Bed | 6.7 | 20.4 | 63.7 | 57.5 |
| 14 | Yes | 5 | 60 | 30 | Roaster | 7.1 | 13.0 | 63.2 | 58.3 |
| 15 | Yes | 5 | 60 | 30 | Roaster | 7.1 | 13.0 | 63.7 | 56.2 |
| | | | | | Pooled Variance: | | 0.211 | 11.66 | 7.48 |

1. In vitro fermentation ammonia release.
2. Dacron bag undegradable protein (UIP), and
3. Dacron bag rumen escape fat.

The results are reported in Table 4 as well as in FIGS. 3–6.

Results

1. Steam conditioning caused a significant improvement over dry roasting when samples were evaluated by in vitro fermentation; average NH$_3$—N release was 25.9% (sample 8 and sample 9) and 52.6% (sample 6 and sample 7) with and without steam, respectively. Roasting xylose treated beans without steam conditioning produced a relatively small in vitro response versus roasting with no xylose; NH$_3$—N release was 52.6% and 60.9% with and without xylose, respectively.

2. Average rumen escape fat (REF) was higher for roasted samples but this difference was not significant. In contrast to in vitro results, dry roasting was as effective as steam conditioning.

3. Application of sugar followed by heat caused non-enzymatic browning to occur in all three methods. When tested by placing dacron bags in the rumen of cows, all treatments showed increased escape protein and escape fat. However, when tested in vitro, samples prepared by roasting alone showed protein protection was not enhanced by sugar treatment, therefore there could be no corresponding enhancement of escape fat. In vitro tests require that the sample be ground while dacron bag test use the sample in coarse form. This result indicates that protection would be lost as the sample is ground during mastication.

4. Close examination of cracked beans treated by the three methods showed browning only occurred on the surface of Roasted only beans. Since these are heated by hot air, the net movement of moisture is from the inside of the bean to the outside; under these conditions the soluble sugars cannot penetrate the interior of the particles.

5. Beans that were first heated by direct addition of steam showed a gradation of browning from surface to the center. Heating with live steam causes the net migration of moisture to be from the surface of the bean to its center, carrying the sugar along with it. This penetration of heat and sugar at the same time is conducive to a more uniform browning throughout the particle, such that when the particle is ground there is no loss in protein protection. In this manner mastication cannot destroy the protection.

Discussion:

Steam conditioning clearly effects the percentage of in vitro NH$_3$—N release. This response is caused by deeper penetration of the xylose into the bean. When bean particles are split and examined under the microscope, browning is observed only on the surface of the roasted beans, but browning penetrates nearly to the center of particles that are conditioned with steam. Surface protection is of little benefit for in vitro fermentation as samples are ground prior to testing. Mastication could have a similar effect.

Variation within treatments was low when samples were tested in vitro, indicating replicate treatments were in fact very similar. When samples were evaluated by dacron bag, variation was high. This suggests error in the dacron bag method or a variable surface or particle size response that is removed by grinding.

Figure 3:
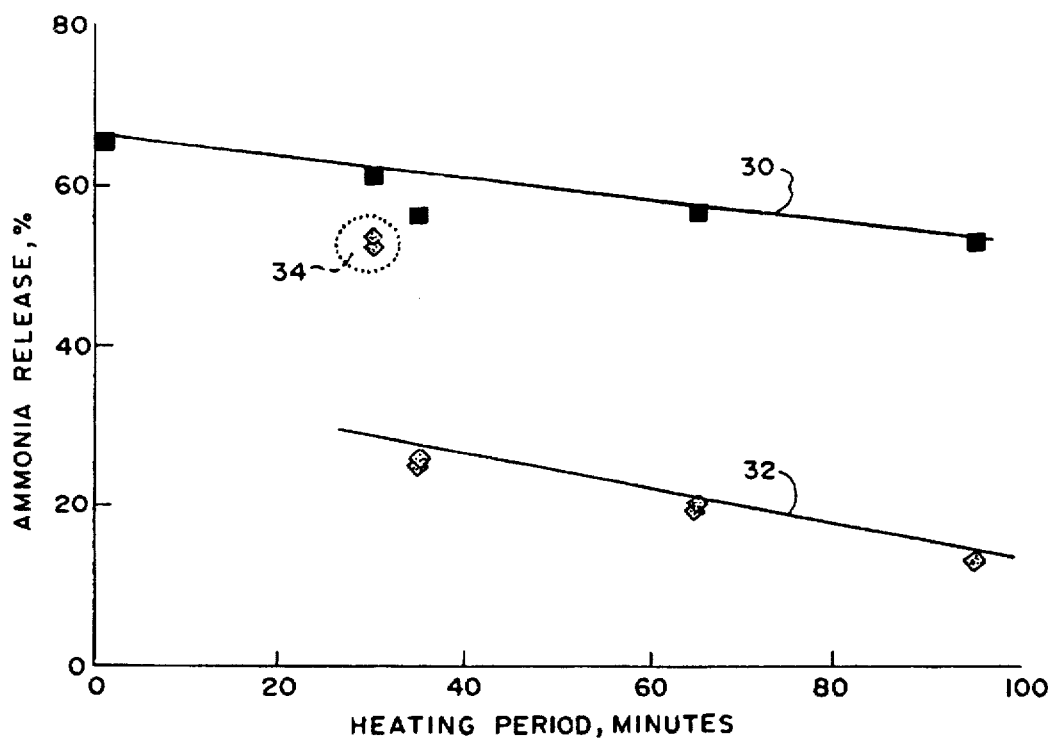
FIG. 3 is a graph showing the relationship between heating time of feed prepared in accordance with the present invention and in vitro $NH_3$—N release.

In FIG. 3 there is shown a curve 30 and a curve 32 having ordinates of ammonia release and abscissae of heating period in minutes with curve 30 representing an untreated control and curve 32 enzymic browning using xylose. Both were measured in vitro. Data points 34 represent measurements made without using steam.

Figure 4:
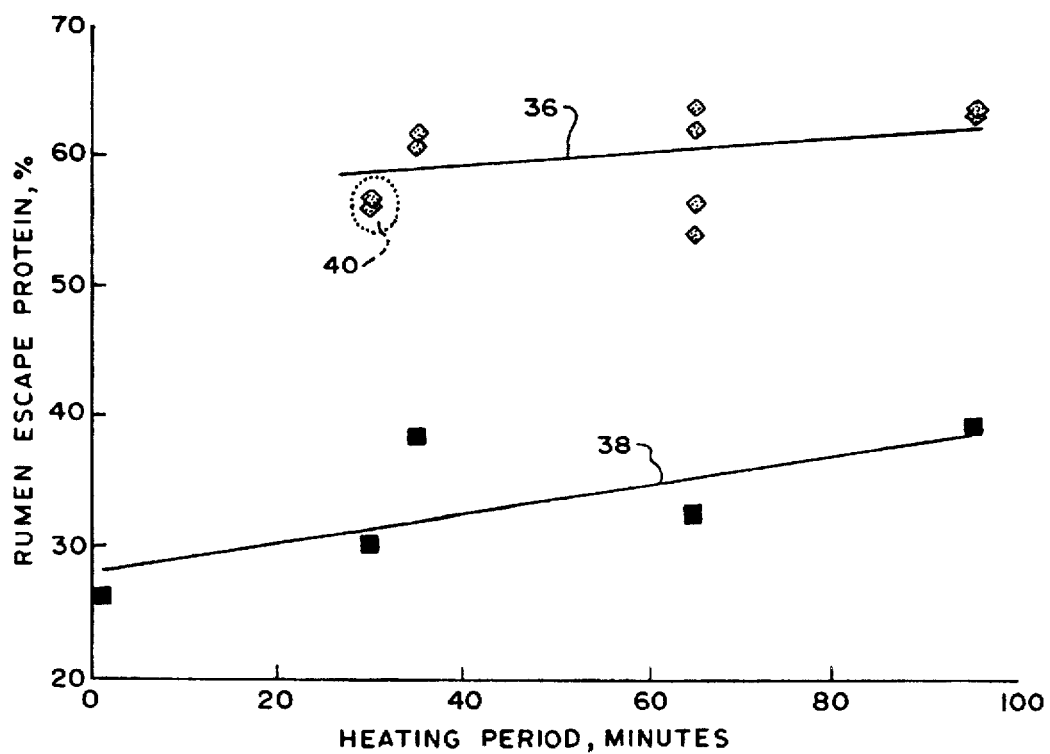
FIG. 4 is a graph showing the relationship between the heating time of feed prepared in accordance with the present invention on the percentage of rumen escape protein.

In FIG. 4, there is shown a curve 36 and a curve 38 having ordinates of percentage rumen escape protein and abscissae of heating period in minutes for the non-enzymic browning treatment. Curve 36 is for treatment with xylose and curve 38 is for the control. Data points 40 are tests made without steam. The results were obtained from a rumen dacron bag experiment.

Figure 5:
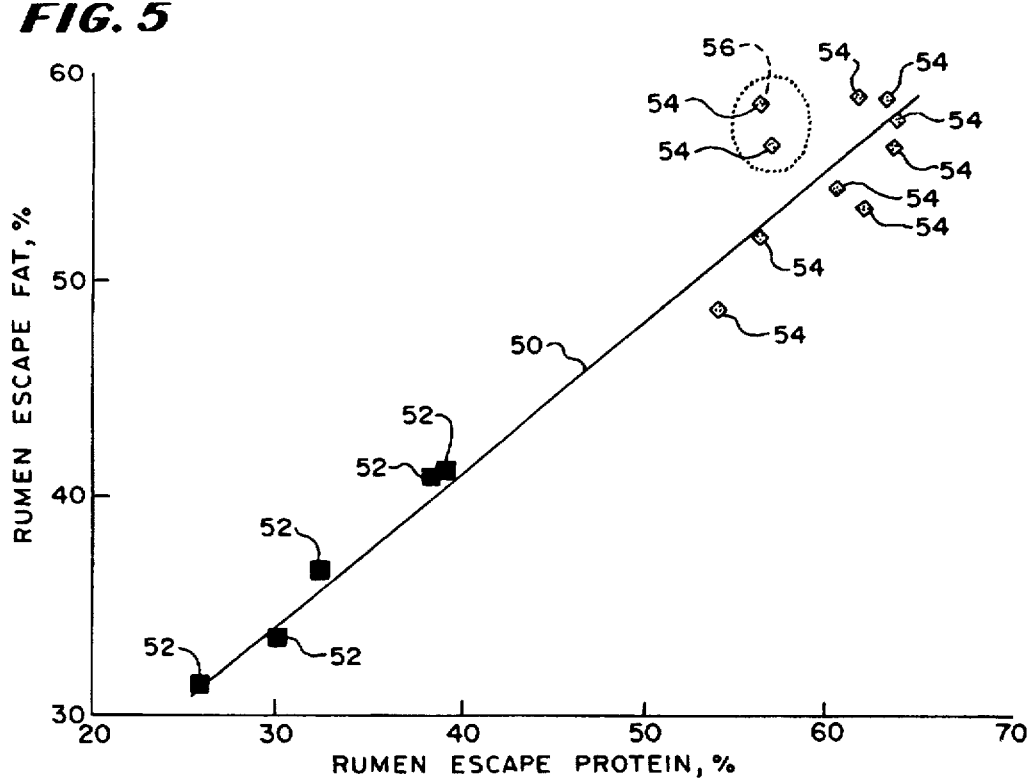
FIG. 5 is a graph showing the relationship between rumen escape fat and rumen escape protein.

In FIG. 5, there is shown a curve 50 having ordinates of percentage rumen escape fat and abscissae of rumen escape protein showing a linear relationship between the control, data points of which are shown at 52, and soya treated with xylose for non-enzymic browning, data points for which are shown at 54. The points at 56 represent xylose treated soya without the application of steam. This curve shows the linear relationship between protein protection and fat protection.

Figure 6:
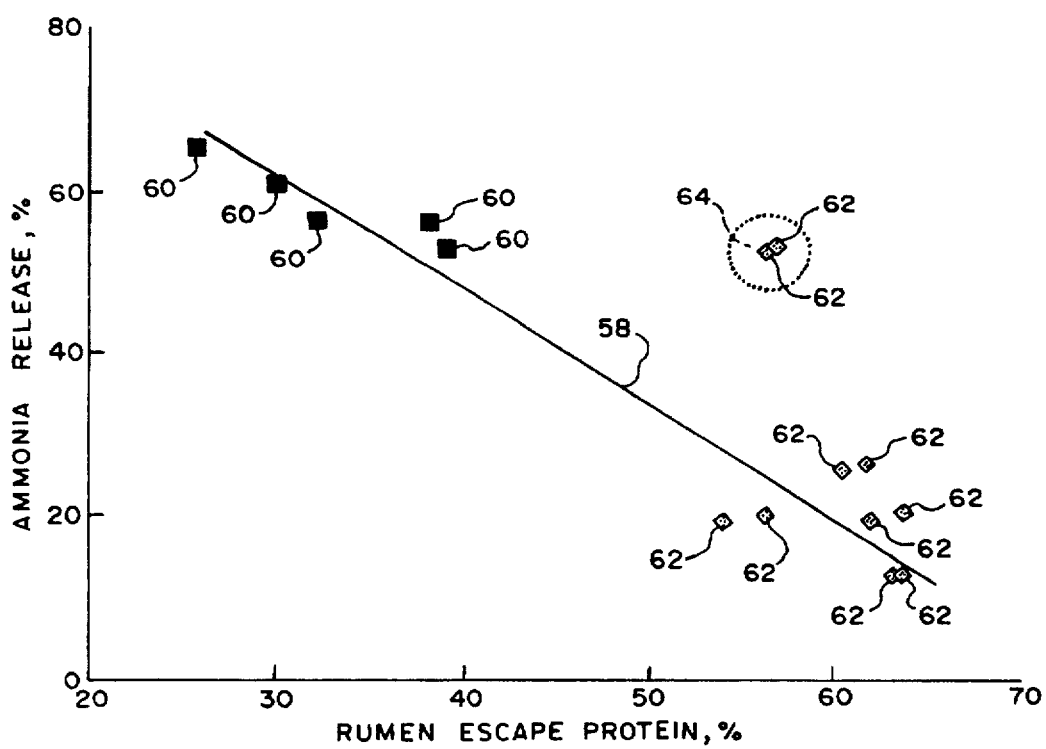
FIG. 6 is a graph showing the relationship of in vitro nitrogen loss to the amount of rumen escape protein.

In FIG. 6, there is shown a curve 58 having ordinates of released ammonia and abscissae of rumen escape protein, with points 60 being control protein, and points 62 protein treated with xylose, and points at 64 being treated without steam. The linear relationship shows protection directly correlated with Maillard reaction phenomena and with penetration.

In vitro, increasing the minutes under heat reduces the level of $NH_3$—N release, with or without xylose. The rate of decrease is greater in the presence of xylose; slopes of the regression lines were −0.12 and −0.21 with 0% and 4% ML-2, respectively. This change in slope is consistent with a browning reaction that is driven by heat. Samples 6 and 7 do not fit the 4% ML-2 regression line in FIG. 3. This is because they were not steamed.

EXAMPLE 4

This example shows the effect of fat from non-enzymatically browned beans (NEBB) and soybean oil on milk fatty acids, ruminal fiber digestion, and volatile fatty acid levels in dairy cows fed at high intake levels.

Procedures:

Four ruminally fistulated Holstein dairy cows were assigned to one of four diets in a 4×4 Latin square design with three-week periods. The diets were:

1. Control, no added fat,
2. 4% added fat from NEBB,
3. 4% added fat from soybean oil—Soy Pass, and
4. 6% added fat from NEBB.

All diets contained 50% forage (dry basis) and were fed twice daily as total mixed rations to promote maximal dry matter intake.

Measurements included:

1. Dry matter intake
2. Milk yield and composition
   a. Milk fat and fatty acid profiles
   b. Milk protein
   c. Milk lactose
3. Ruminal in situ neutral detergent fiber (NDF) digestion kinetics
4. Ruminal pH and volatile fatty acids (VFA)
5. Rate of forage passage
6. Total tract NDF digestibility
7. Apparent extent of ruminal NDF digestion at passage rates and intake levels characteristic of lactating dairy cows.

The results are reported in Tables 5–10.

Results:

The level of linoleic acid was increased in diets containing NEBB. The source of linoleic acid is soybean oil contained in the bean. However, when oil was added to the diet without the protection of the protein there was no increase in linoleic acid; it was entirely hydrogenated by rumen bacteria.

Not only do the bacteria effect the oil and its fatty acid composition, the oil also effects the bacteria. Addition of unprotected oil causes a significant reduction in the production of acetic acid by rumen bacteria. A reduction in acetic acid is an indication that fiber digestion has been reduced. Fiber digestion (NDF) dropped from 60% in the control to 48.6% with added oil.

Table 5 gives the ingredient and nutrient composition of the diets fed during the dairy metabolism trial. All diets contained 50% forage (25% alfalfa:75% corn silages, dry basis) and 0.5% urea to ensure that the requirement for soluble crude protein (CP) was met for all diets. All diets contained approximately 20.7% CP and either 4% (diets 2 and 3) or 6% added fat (diet 3) from soybean oil or NEBB. Soy Pass an non-enzymatically browned soybean meal (<0.1%) was used as the supplemental CP source in all diets (along with urea) to minimize any confounding effect of protein on measured responses.

Table 6 gives the performance responses by diet. There were no major effects of diet on any measurement of performance. Because measurement of performance was not an objective of this trial, 3 week periods were used. Potential for carryover effects from one period to another for milk production is large, and so no conclusions should be drawn from Table 6 other than that no diet caused a severe reduction to intake or milk production.

Table 7 shows the milk fatty acid profiles as influenced by source of added fat. The key responses occurred for C16:0 and C18:0–18:3. Addition of fat from either soybean oil or NEBB reduced concentration of C16:0 in the milk fat. Furthermore, soybean oil addition reduced C18:2 relative to the NEBB diets, whereas C18:1 and C18:0 were increased. These results indicate that oil from the NEBB was ruminally protected versus soybean oil. In fact, the level of C18:2 was essentially doubled for the NEBB diets compared with the Control diet.

Table 8 illustrates the effect of diet on in situ kinetics of NDF digestion for alfalfa and soyhulls. The response was similar for both sources of fiber. The greatest rate of NDF digestion was

TABLE 5

Experimental Diets for Dairy Metabolism Trial

| | Diet 1 | | | |
|---|---|---|---|---|
| Item | 1 | 2 | 3 | 4 |
| Ingredient | | | | |
| Alfalfa silage | 12.3 | 12.3 | 12.3 | 12.3 |
| Corn silage | 37.8 | 37.8 | 37.8 | 37.8 |
| Corn, ground | 23.2 | 14.7 | 17.3 | 10.2 |
| Soy Pass | 23.3 | 11.7 | 24.4 | 6.0 |
| Urea | .5 | .5 | .5 | .5 |
| Treated soybean | — | 20.2 | — | 30.4 |
| Soybean oil | — | — | 4.0 | — |
| Min/vit premix | 2.9 | 2.8 | 3.7 | 2.8 |
| Composition | | | | |
| DM, % | 52.4 | 52.5 | 52.2 | 52.5 |
| CP, % of DM | 20.8 | 20.7 | 20.8 | 20.7 |
| UIP, % of CP | 56.8 | 48.5 | 51.1 | 51.9 |
| Lipid from soybean, % of DM | — | 4.0 | 4.0 | 6.0 |
| $NE_l$, Mcal/kg | 1.70 | 1.85 | 1.85 | 1.94 |

[1]Diet 1 = Control, Diet 2 = 4% fat from treated soybean, Diet 3 = 4% fat from soybean oil, and Diet 4 = 6% fat from treated soybean.

TABLE 6

Performance Responses During Dairy Metabolism Trial

| | Diet 1 | | | | |
|---|---|---|---|---|---|
| Item | 1 | 2 | 3 | 4 | SE |
| DMI, kg/d | 24.75 | 23.68 | 26.63 | 25.93 | 2.45 |
| DMI, % BW | 4.32 | 4.15 | 4.70 | 4.52 | .38 |
| Milk yield, kg/d | 31.50 | 32.80 | 35.90 | 32.50 | 1.90 |
| Milk fat, % | 4.12 | 4.15 | 3.35 | 3.28 | .51 |
| Milk fat, kg/d | 1.49 | 1.32 | 1.18 | 1.04 | .13 |
| Milk protein, % | 3.12 | 3.01 | 3.16 | 3.13 | .38 |

TABLE 6-continued

Performance Responses During Dairy Metabolism Trial

| Item | Diet 1 | | | | SE |
|---|---|---|---|---|---|
| | 1 | 2 | 3 | 4 | |
| Milk protein, Kg/d | 1.12 | 1.05 | 1.14 | .95 | .06 |
| Milk lactose, % | 4.80 | 4.78 | 4.86 | 5.06 | .47 |
| Milk lactoee, kg/d | 1.72 | 1.39 | 1.73 | 1.54 | .11 |
| 4% FCM, kg/d | 32.10 | 33.50 | 32.40 | 29.00 | .80 |
| Efficiency, FCM/DMI, kg/kg | 1.30 | 1.30 | 1.20 | 1.20 | <.10 |

[1]Diet 1 = Control, Diet 2 = 4% fat from treated soybean, Diet 3 = 4% fat from soybean oil, and Diet 4 = 6% fat from treated soybean.
[a,b,c]Means within a row with unlike supercripts differ (P < .10).

TABLE 7

Mike Fatty Acid Profiles as Influenced by Source of Added Fat

| Fatty acid | Diet 1 | | | | SE |
|---|---|---|---|---|---|
| | 1 | 2 | 3 (weight %) | 4 | |
| ≦8:0 | 2.59$^b$ | 2.11$^b$ | 5.18$^b$ | 2.16$^b$ | .31 |
| 10:0 | 3.71 | 3.40 | 2.89 | 3.57 | .33 |
| 12:0 | 4.63 | 3.71 | 2.78 | 4.08 | .39 |
| 14:0 | 13.17 | 12.25 | 9.67$^b$ | 11.59 | .98 |
| 14:1 | 1.25$^a$ | 1.49$^a$ | 1.16$^a$ | 1.01$^b$ | .13 |
| 16:0 | 40.12$^a$ | 28.74$^b$ | 26.08$^b$ | 29.98$^b$ | 2.92 |
| 16:1 | 3.57$^a$ | 3.08$^a$ | 2.48$^b$ | 2.13$^b$ | .20 |
| 18:0 | 9.47$^c$ | 16.97 | 20.31$^a$ | 14.69$^b$ | 1.08 |
| 18:1 | 16.76$^c$ | 19.57$^b$ | 24.73$^a$ | 20.45$^b$ | 1.16 |
| 18:2 | 3.83$^b$ | 7.29$^a$ | 3.32$^b$ | 8.31$^a$ | .80 |
| 18:3 | .35$^b$ | .84$^a$ | 1.06$^a$ | .92$^a$ | .07 |
| 20:0 | .55 | .53 | .49 | 1.00 | .14 |

[1]Diet 1 = Control, Diet 2 = 4% fat from treated soybean, Diet 3 = 4% fat from soybean oil, and Diet 4 = 6% fat from treated soybean.
[a,b,c]Means within a row with unlike supercripts differ (P < .10).

TABLE 8

Kinetics of Fiber Digestion and Passage from the Rumen

| Item | Diet 1 | | | | SE |
|---|---|---|---|---|---|
| | 1 | 2 | 3 | 4 | |
| Alfalfa | | | | | |
| Lag, h | 4.07$^a$ | −1.08$^b$ | −4.96$^c$ | 1.76$^a$ | 1.24 |
| $K_d$, h$^{-1}$ | .115$^a$ | .063$^{ab}$ | .050$^b$ | .070$^a$ | .019 |
| Extent, % | 49.87 | 44.94 | 47.67 | 47.24 | 2.42 |
| $K_p$, h$^{-1}$ | .041 | .039 | .045 | .041 | .004 |
| Soyhulls | | | | | |
| Lag, h | 7.76$^a$ | 7.79$^a$ | 4.45$^b$ | 7.17$^a$ | .879 |
| $K_d$, h$^{-1}$ | .104$^a$ | .083$^{ab}$ | .062$^b$ | .096$^a$ | .012 |
| Extent, % | 94.25$^a$ | 93.52$^{ab}$ | 93.05$^{ab}$ | 92.60$^b$ | .56 |

[1]Diet 1 = Control, Diet 2 = 4% fat from treated soybean, Diet 3 = 4% fat from soybean oil, and Diet 4 = 6% fat from treated soybean.
[a,b,c]Means within a row with unlike superscripts differ (P < .10).

TABLE 9

Apparent Extent of Alfalfa Fiber Digestion by Diet

| Item | Diet 1 | | | |
|---|---|---|---|---|
| | 1 | 2 | 3 | 4 |
| Lag, h | 4.07 | −1.08 | −4.90 | 1.70 |
| $K_d$, h$^{-1}$ | .115 | .063 | .050 | .070 |
| PED, % | 49.8 | 44.9 | 47.6 | 47.2 |
| $K_p$, h$^{-1}$ | .041 | .039 | .045 | .041 |
| $e^{-K_p L}$ | .846 | 1.00 | 1.00 | .933 |
| $K_d/(K_d + K_p)$ | .737 | .618 | .526 | .631 |
| $e^{-K_p L} \times K_d/(K_d + K_p)$ | .624 | .618 | .526 | .589 |
| AED[1], % | 31.1 | 27.7 | 25.0 | 27.8 |

[1]$AED = PED \times e^{-K_p L} \times K_d/(K_d + K_p)$.

TABLE 10

Ruminal pH and Volatile Fatty Acids, and NDF Digestibility by Diet

| Item | Diet 1 | | | | SE |
|---|---|---|---|---|---|
| | 1 | 2 | 3 | 4 | |
| pH | 6.32$^a$ | 6.07$^b$ | 6.25$^a$ | 6.04$^b$ | .05 |
| VFA, mM/L | | | | | |
| Acetate | 68.8 | 73.9 | 63.2 | 76.6 | 7.2 |
| Propionate | 21.7 | 22.1 | 24.0 | 23.1 | 1.1 |
| Isobutyrate | .9$^a$ | .9$^a$ | 1.0$^a$ | .8$^b$ | <.1 |
| Butyrate | 13.3 | 14.3 | 13.7 | 13.7 | .7 |
| Isovalerate | 1.4$^a$ | 1.4$^a$ | 1.5$^a$ | 1.3$^b$ | .1 |
| Valerate | 1.6$^b$ | 1.7$^{ab}$ | 1.8$^a$ | 1.5$^b$ | <.1 |
| VFA, mol/100 mol | | | | | |
| Acetate | 63.5$^{ab}$ | 63.9$^a$ | 60.5$^b$ | 64.7$^a$ | <.1 |
| Propionate | 20.4$^{ab}$ | 19.7$^b$ | 22.5$^a$ | 19.8$^b$ | <.1 |
| Isobutyrate | .9 | .9 | 1.0 | .8 | <.1 |
| Butyrate | 12.1 | 12.7 | 12.9 | 12.1 | <.1 |
| Isovalerate | 1.3 | 1.3 | 1.4 | 1.2 | <.1 |
| Valerate | 1.5$^{ab}$ | 1.5$^{ab}$ | 1.7$^a$ | 1.3$^b$ | <.1 |
| Acetate:Propionate | 3.14$^a$ | 3.27$^a$ | 2.76$^b$ | 3.36$^a$ | .16 |
| NDF digestibility, % | 60.0 | 65.0 | 48.6 | 56.3 | 9.2 |

[a,b]Means within a row with unlike superscripts differ (P < .10).

for the Control diet, as expected. The lowest NDF digestion rate was observed for the 4% soybean oil diet. The rates for the diets containing 4% and 6% fat from NEBB were intermediate. This response indicates that the oil in the NEBB was ruminally protected and supports the milk fatty acid data.

Table 9 incorporates rate of passage into a model of fiber digestion which predicts apparent extent of ruminal NDF digestion. As can be seen, the total extent of NDF digestion in the rumen is least for the soybean oil diet, highest for the Control diet, and intermediate for the NEBB diets. Again, this is evidence of ruminal protection of the oil in NEBB.

Table 10 gives the pH and volatile fatty acids as affected by diet. All pH levels were above 6.0, when averaged over 24 hours. However, the acetate:propionate ratio was reduced for the soybean oil diet versus the NEBB diets. This result is again strong evidence for ruminal protection of fat in the NEBB compared with soybean oil. Furthermore, there was no significant effect of diet on total tract NDF digestibility, although the value for the soybean oil diet was numerically less than the other three diets.

From the above description it can be understood that the feed of this invention and its method of making and using it have several advantages, such as for example: (1) both oil and protein are better utilized; (2) it is economical to make; and (3) it may be used to improve the quality of milk.

Although a preferred embodiment has been described with particularlity, many other modes of carrying out the invention are contemplated and are possible from and with the above teachings. Accordingly, it is to be understood that, within the scope of the following claims, the invention may be practiced other than as specifically described.

What is claimed is:

1. A feed for animals comprising a mixture of organic material including unbroken organelles having lipid bodies, at least partly encased by a thin membrane that includes a reaction product of a reducing sugar and a proteinaceous material.

2. A feed in accordance with claim 1 in which the reaction product is principally at least one of early and intermediate Maillard reaction products.

3. A feed in accordance with claim 1 in which the lipid is a fatty acid.

4. A feed in accordance with claim 1 in which the reaction product is a reaction product of an oleosin with a reducing sugar.

5. A feed in accordance with claim 4 in which said reaction product comprises more than 1% by weight of the proteinaceous material.

6. A feed in accordance with claim 5 in which the reaction product falls within a range of 1% to 35% by weight of the proteinaceous material.

7. A method of making a feed for milk-producing ruminants comprising the steps of:

selecting an end use for the milk of the milk producing ruminant;

determining the desired proportion of vegetable unsaturated fat to saturated fat in the milk;

selecting an oilseed having a desired vegetable oil;

causing a reducing carbohydrate and heat to be applied to at least some of the selected oilseed, wherein at least some unbroken organelles having lipid bodies within the oilseed become at least partly bypass protected; and mixing the bypass protected oilseed in a proportion with another feed required for the desired ratio of vegetable unsaturated fat to saturated fat in the milk of the milk-producing ruminant, wherein the produced milk is substantially of the composition desired.

8. A method according to claim 7 wherein the step of causing a reducing carbohydrate and heat to be applied comprises causing said reducing sugar to penetrate the oilseed and make contact with a substantial portion of said lipid bodies and wherein said heat is applied in such a manner as to form a substantial number of lipid bodies encapsulated in a rumen inert membrane.

9. A method according to claim 8 wherein the rumen inert membrane is an oleosin and is caused to become a reaction product of a reducing sugar and a proteinaceous material, and the encapsulated bodies have diameters in the range of 0.1 and 10 micrometers.

10. A method according to claim 7 wherein the step of causing a reducing carbohydrate and heat to be applied comprises the step of causing a Maillard reaction.

11. A method according to claim 10 in which the Maillard reaction is an early Maillard reaction between a reducing sugar and a proteinaceous membrane to encapsulate at least some lipid bodies wherein a reversible reaction encapsulates the lipid bodies.

12. A method according to claim 10 wherein degradability of lipid in the oilseed by rumen microorganisms is reduced and there is significant lipid body digestibility in the post rumen tract of the ruminant.

13. A method of making a ruminant feed comprising the steps of:

selecting an oilseed having a vegetable oil;

causing a reducing carbohydrate and heat to be applied to at least some lipid bodies of the selected oilseed, wherein at least some intact organelles having lipid bodies within the oilseed become at least partly bypass protected; and feeding bypass protected oilseed of the selected type to a ruminant.

14. A method according to claim 13 wherein the step of causing a reducing carbohydrate and heat to be applied comprises causing a reducing sugar to penetrate the oilseed and make contact with a substantial portion of said lipid bodies and wherein said heat is applied in such a manner as to form a substantial number of lipid bodies encapsulated in a rumen inert membrane.

15. A method according to claim 14 wherein the rumen inert membrane is an oleosin and is caused to become a reaction product of a reducing sugar and a proteinaceous material, and the encapsulated bodies have diameters in the range of 0.1 and 10 micrometers.

16. A method according to claim 15 in which the Maillard reaction is an early Maillard reaction between a reducing sugar and a proteinaceous membrane to encapsulate at least some lipid bodies wherein a reversible reaction encapsulates the lipid bodies.

17. A method according to claim 14 wherein degradability of lipid in the oilseed by rumen microorganisms is reduced and there is significant lipid body digestibility in the post rumen tract of the ruminant.

18. A method according to claim 13 wherein the step of causing a reducing carbohydrate and heat to be applied comprises the step of causing a Maillard reaction.

19. A method according to claim 13 wherein the step of causing a reducing carbohydrate and heat to be applied includes the step of causing a 1 mole to 1 mole reaction between free amino groups on the surface of the lipid bodies and the reducing carbohydrate.

20. A method according to claim 13 in which the heat and carbohydrate are such as to cause enough alpha and epsilon amino groups surrounding lipid bodies in the oilseed to react with carbonyl groups in the reducing carbohydrate to form a reaction product that reduces degradation of the lipid in the rumen.

21. A method of making a ruminant feed comprising the steps of:

providing an oilseed, the interior of which includes unbroken organelles having lipid bodies, said oilseed containing protein and vegetable oil digestible by a ruminant animal;

cracking the oilseed to expose its interior;

applying a reducing carbohydrate to said cracked oilseed to form a mixture;

processing the reducing carbohydrate and cracked oilseed mixture to cause penetration of the reducing carbohydrate into the interior of said cracked oilseed; and heating the reducing carbohydrate and cracked oilseed at a temperature and for a time sufficient to cause non-enzymatic browning of oilseed protein to thereby render said oilseed protein resistant to rumen microbial degradation and to encapsulate at least some of the lipid bodies in a protective membrane.

22. The method of claim 21 wherein said oilseed is selected from the group consisting of soybean, canola seed, cotton seed, sunflower seed, linseed, rape seed, safflower seed and sesame seed.

23. The method of claim 21 wherein the step of cracking the oilseed comprises mechanically cracking the oilseed.

24. The method of claim 23 wherein the step of mechanical cracking comprises passing the oilseed through a roller mill.

25. The method of claim 21 wherein said reducing carbohydrate is selected from the group consisting of xylose, glucose, fructose, lactose, mannose, ribose, hemicellulose extracts and their hydrolysates, sugars contained in spent sulfite liquor, molasses and its hydrolysates, corn products and their hydrolysates, and mixtures thereof.

26. The method of claim 21 wherein the percentage in the oilseed of reducing carbohydrate to oilseed is from about 0.1 percent to about 40 percent by weight.

27. The method of claim 21 wherein the step of heating occurs at a pH of from about 2 to about 10.5.

28. The method of claim 21 wherein the step of heating occurs at a an oilseed moisture content of from about 6 percent to about 40 percent.

29. The method of claim 21 wherein the step of heating occurs at a temperature of from about 20° C. to about 150° C.

30. The method of claim 21 wherein the step of heating is for a time of from about 20 minutes to about 72 hours.

31. The method of claim 21 wherein the reducing carbohydrate is in solution when applied to said cracked oilseed.

32. The method of claim 31 wherein the step of applying the reducing carbohydrate to said cracked oilseed comprises spraying said solution onto said cracked oilseed.

33. The method of claim 21 wherein the step of processing the reducing carbohydrate and cracked oilseed mixture comprises raising the temperature of the mixture above ambient.

34. The method of claim 33 wherein the step of raising the temperature of the mixture is accomplished with steam.

35. The method of claim 21 wherein the step of processing the reducing carbohydrate and cracked oilseed mixture comprises steeping the mixture.

36. The method of claim 35 wherein the step of steeping the mixture takes place at a temperature below the boiling point of the mixture.

37. The method of claim 21 further including the step of drying the oilseed before cracking.

38. The method of claim 21 further including the step of drying the oilseed after cracking but before applying the reducing carbohydrate.

39. A feed for ruminants comprising:

an oilseed;

said oilseed including an outer hull with at least one opening in it, unbroken organelles having lipid bodies in the interior of the hull and a reaction product of a reducing carbohydrate and a protein in the interior of the hull, at least some of the reaction product encasing at least some of the lipid bodies to form a plurality of encased lipid bodies.

40. A feed in accordance with claim 39 in which the reaction product is principally at least one of early and intermediate Maillard reaction products.

41. A feed in accordance with claim 39 in which the reaction product is a reaction product of an oleosin with a reducing sugar.

* * * * *

UNITED STATES PATENT AND TRADEMARK OFFICE
Certificate

Patent No. 5,789,001            Patented: August 4, 1998

On petition requesting issuance of a certificate for correction of inventorship pursuant to 35 U.S.C. 256, it has been found that the above identified patent, through error and without deceptive intent, improperly sets forth the inventorship.

Accordingly, it is hereby certified that the correct inventorship of this patent is: Terry James Klopfenstein, Lincoln, NE; Thomas Stephen Winowiski, Mosinee, WI; Robert Allen Britton, deceased, late of Lincoln, NE, by Peggy Jo Luebbe, executor; and Norman A. Barney, Lenexa, KS.

Signed and Sealed this Twenty-Sixth Day of November 2002.

D. GABRIELLE BROUILLETTE
*Supervisory Patent Examiner*
Art Unit 1761